United States Patent
Ryoo et al.

(10) Patent No.: US 12,436,106 B2
(45) Date of Patent: Oct. 7, 2025

(54) APPARATUS AND METHOD FOR INSPECTING SEMICONDUCTOR DEVICE

(71) Applicant: SAMSUNG ELECTRONICS CO., LTD., Suwon-si (KR)

(72) Inventors: Hyunwoo Ryoo, Suwon-si (KR); Seulji Song, Suwon-si (KR); Minji Jeon, Suwon-si (KR); Hidong Kwak, Suwon-si (KR); Jeongho Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 184 days.

(21) Appl. No.: 18/222,608

(22) Filed: Jul. 17, 2023

(65) Prior Publication Data
US 2024/0077424 A1    Mar. 7, 2024

(30) Foreign Application Priority Data

Sep. 6, 2022  (KR) .................. 10-2022-0113052
Nov. 10, 2022 (KR) .................. 10-2022-0149776

(51) Int. Cl.
  *G01N 21/65*  (2006.01)
  *G01J 3/02*   (2006.01)
  *G01J 3/44*   (2006.01)

(52) U.S. Cl.
  CPC ............ *G01N 21/65* (2013.01); *G01J 3/0216* (2013.01); *G01J 3/4412* (2013.01)

(58) Field of Classification Search
  CPC ...... G01N 21/65; G01J 3/0216; G01J 3/4412; G01J 3/28; G01J 3/2803; G01J 3/44
  See application file for complete search history.

(56) References Cited

U.S. PATENT DOCUMENTS 6,057,908 A  *  5/2000  Ota ................... G03F 7/70641
                                                  250/548
8,190,242 B2 *  5/2012  Demos ............... G01N 21/6486
                                                  600/476
(Continued)

FOREIGN PATENT DOCUMENTS

CN   113075195 A   7/2021
CN   114295522 A   4/2022
(Continued)

OTHER PUBLICATIONS

CN216955678U_Translation (Year: 2022).*
(Continued)

*Primary Examiner* — Tarifur R Chowdhury
*Assistant Examiner* — Carlos Perez-Guzman
(74) *Attorney, Agent, or Firm* — Sughrue Mion, PLLC

(57) ABSTRACT

A semiconductor-device inspection apparatus includes a stage configured to allow a measurement target to be placed thereon, an actuator configured to move the stage in a vertical direction, a detector configured to detect a plurality of Raman spectra from scattered light that has been scattered away from the measurement target, and a processor configured to generate a plurality of spectral images for a measurement variable by using the plurality of Raman spectra detected by the detector, wherein the detector is further configured to detect the plurality of Raman spectra at different vertical levels of the measurement target.

17 Claims, 14 Drawing Sheets

(56) References Cited

U.S. PATENT DOCUMENTS

| | | |
|---|---|---|
| 9,595,481 B1 | 3/2017 | Malkova et al. |
| 10,222,231 B2* | 3/2019 | Allen ................ G01D 5/14 |
| 10,222,321 B2 | 3/2019 | Yamamoto et al. |
| 11,293,871 B2 | 4/2022 | Oren |
| 11,378,451 B2 | 7/2022 | Wang et al. |
| 2017/0322146 A1* | 11/2017 | Murayama ............ G01N 21/27 |
| 2019/0154585 A1* | 5/2019 | Xiang ................... G01N 21/65 |
| 2021/0349299 A1* | 11/2021 | Wang .................. G02B 21/365 |
| 2022/0349752 A1* | 11/2022 | Wang ....................... G01J 3/28 |
| 2023/0273253 A1* | 8/2023 | Shirasaki ............... G01R 31/26 |
| 2023/0324303 A1* | 10/2023 | Antonelli ................. G01J 3/18 |
| 2023/0417677 A1* | 12/2023 | Vo-Dinh ............. A61B 5/0077 |
| 2025/0020595 A1* | 1/2025 | Wang ..................... G01B 11/00 |

FOREIGN PATENT DOCUMENTS

| | | | | |
|---|---|---|---|---|
| CN | 216955678 U | * | 7/2022 | ............ G01N 21/01 |
| JP | 2009-188233 A | | 8/2009 | |
| KR | 10-0713302 B1 | | 5/2007 | |

OTHER PUBLICATIONS

Liu et al., "Optical bandgap of single- and multi-layered amorphous germanium ultra-thin films," Journal of Applied Physics, vol. 119, 014304, 2016, Total 10 pages, doi:10.1063/1.4939296.

* cited by examiner

APPARATUS AND METHOD FOR INSPECTING SEMICONDUCTOR DEVICE

CROSS-REFERENCE TO RELATED APPLICATIONS

This application is based on and claims priority under 35 U.S.C. § 119 to Korean Patent Application Nos. 10-2022-0113052, filed on Sep. 6, 2022, and 10-2022-0149776, filed on Nov. 10, 2022, in the Korean Intellectual Property Office, the disclosures of which are incorporated by reference herein in their entirety.

BACKGROUND

The disclosure relates to an apparatus and method for inspecting a semiconductor device, and more particularly, to a semiconductor-device inspection apparatus and method using a Raman spectrum.

In Raman spectroscopy, components of various substances may be analyzed by measuring inelastic scattering occurring in a sample due to excitation light radiated to a sample.

When light is incident to a sample to be measured, inelastic scattered light having a different wavelength than the incident light is detected and measured. A wavelength shift between incident light and scattered light is called a Raman shift, which represents a vibrational or rotational energy state of a component of the sample. Because the intensity of Raman-scattered light is known to directly correspond to a physical property of a component of the sample, Raman spectroscopy is very useful for sample analysis.

SUMMARY

The disclosure provides a semiconductor-device inspection apparatus and method for increasing measurement accuracy and inspection speed.

In accordance with an aspect of the disclosure, a semiconductor-device inspection apparatus includes a stage configured to allow a measurement target to be placed thereon; an actuator configured to move the stage in a vertical direction; a detector configured to detect a plurality of Raman spectra from scattered light that has been scattered away from the measurement target; and a processor configured to generate a plurality of spectral images for a measurement variable by using the plurality of Raman spectra detected by the detector, wherein the detector is further configured to detect the plurality of Raman spectra at different vertical levels of the measurement target.

In accordance with an aspect of the disclosure, a semiconductor-device inspection apparatus includes a stage configured to allow a measurement target to be placed thereon; an actuator configured to move the stage in a vertical direction; a light source configured to generate and output incident light; an objective lens configured to transmit the incident light and scattered light resulting from scattering of the incident light away from the measurement target; a spectrometer configured to split the scattered light by wavelengths; a detector configured to detect a plurality of Raman spectra from the scattered light; a light condensing optical system configured to focus, on the detector, the scattered light transmitted by the objective lens; a first processor configured to: segment the plurality of Raman spectra detected by the detector, classify a plurality of segmented Raman spectra, and generate a plurality of spectral images for a measurement variable from the plurality of classified Raman spectra; and a second processor configured to generate a spectral matrix for the measurement variable by using the plurality of spectral images for the measurement variable, wherein the detector is further configured to detect the plurality of Raman spectra at different vertical levels of the measurement target.

In accordance with an aspect of the disclosure, a method of inspecting a semiconductor device includes providing a measurement target; detecting a plurality of Raman spectra from scattered light scattered away from the measurement target; generating a plurality of spectral images for a measurement variable by using the plurality of Raman spectra; and generating a spectral matrix for the measurement variable by using the plurality of spectral images for the measurement variable, wherein the detecting of the plurality of Raman spectra is performed using the scattered light scattered away from the measurement target at different vertical levels.

BRIEF DESCRIPTION OF DRAWINGS

The above and other aspects, features, and advantages of certain Embodiments of the disclosure will be more apparent from the following detailed description taken in conjunction with the accompanying drawings in which.

DETAILED DESCRIPTION

Figure 1:
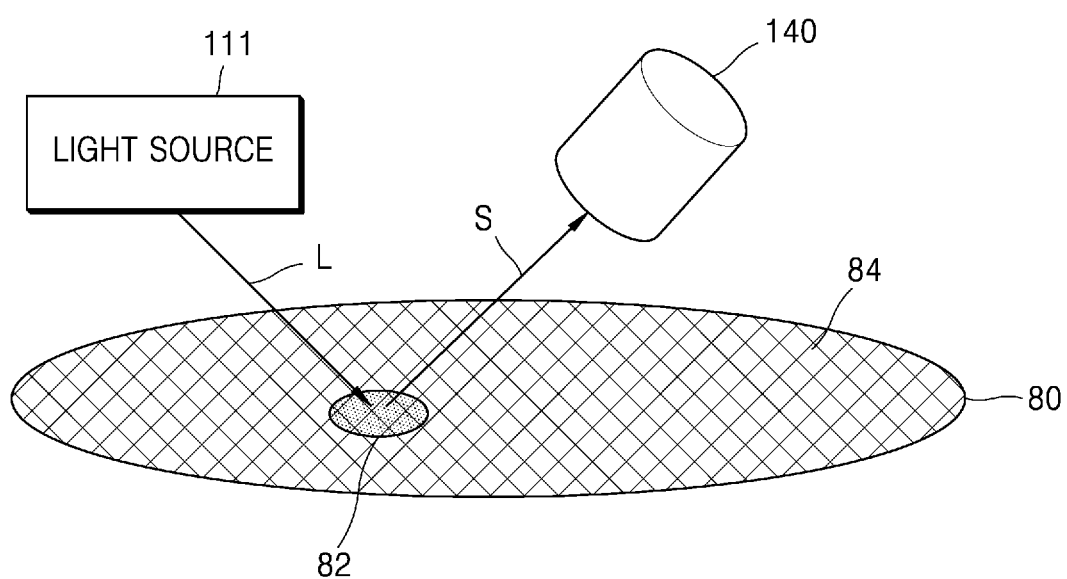
FIG. 1 is a conceptual diagram illustrating a semiconductor-device inspection apparatus according to an embodiment.

Hereinafter, embodiments are described in detail with reference to the accompanying drawings. The embodiments described herein are example embodiments, and thus, the disclosure is not limited thereto and may be realized in various other forms. Like reference numerals in the drawings denote like elements, and thus, descriptions thereof will be omitted.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present. Like numerals refer to like elements throughout.

Spatially relative terms, such as "over," "above," "on," "upper," "below," "under," "beneath," "lower," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

For the sake of brevity, conventional elements to semiconductor devices may or may not be described in detail herein for brevity purposes.

Figure 2:
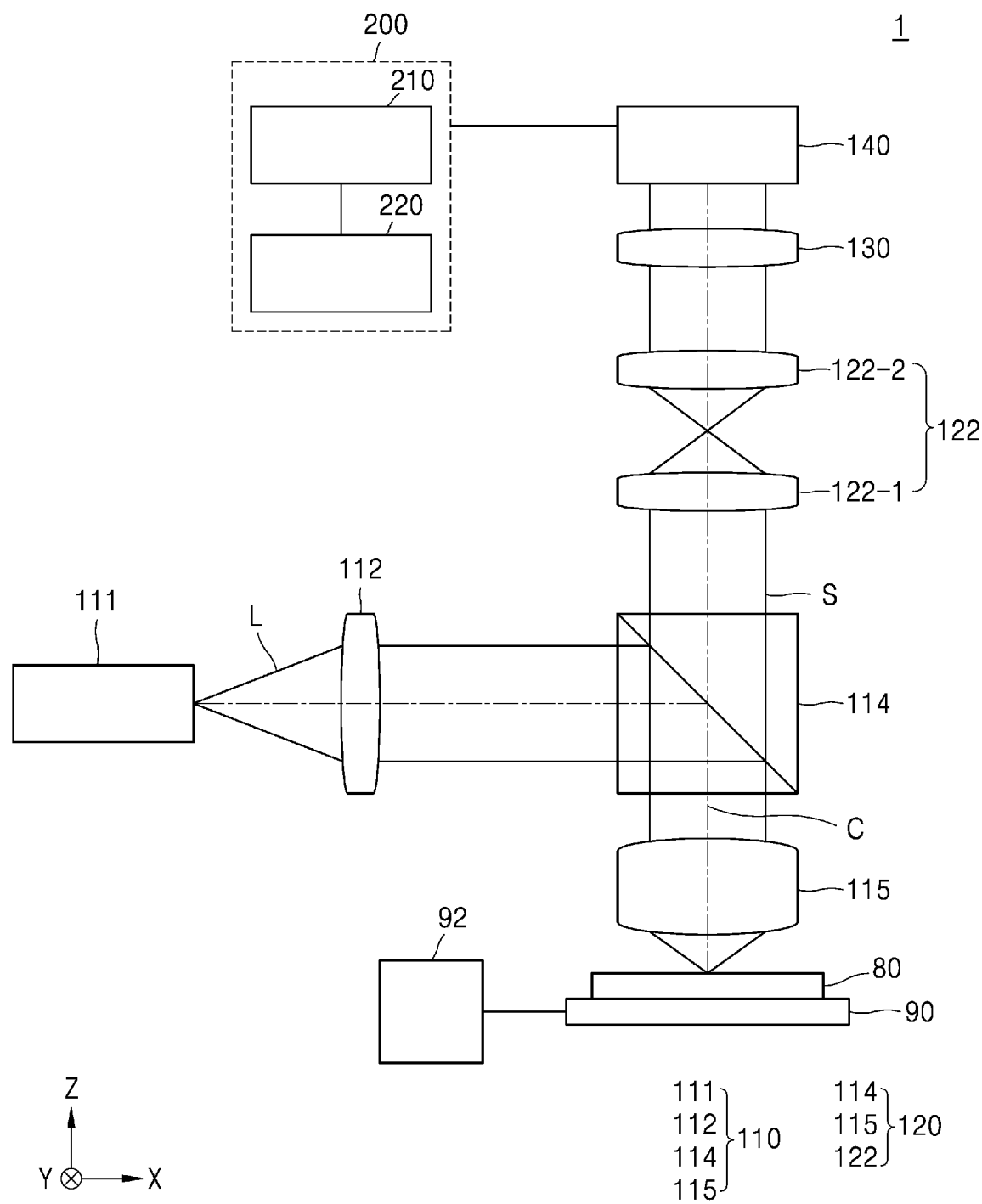
FIG. 2 is a schematic configuration diagram of a semiconductor-device inspection apparatus according to an embodiment.

FIG. 1 is a conceptual diagram illustrating a semiconductor-device inspection apparatus according to an embodiment. FIG. 2 is a schematic configuration diagram of a semiconductor-device inspection apparatus according to an embodiment.

Referring to FIGS. 1 and 2, a semiconductor-device inspection apparatus 1 may include a stage 90, an illuminating optical system 110, a light condensing optical system 120, a spectrometer 130, a detector 140, and a processing unit 200. The semiconductor-device inspection apparatus 1 may receive scattered light S reflected from a wafer 80 and obtain a bandgap spectral image (e.g., 20 of FIG. 5).

According to an embodiment, the semiconductor-device inspection apparatus 1 may inspect the wafer 80 by using Raman spectroscopy. Measurement variables that may be measured by the semiconductor-device inspection apparatus 1 may include bandgap energy, a pattern height, a physical property, chemical bonding, vibration, and/or stress. The wafer 80 may include the measurement region 82. Incident light L is emitted from a light source 111 to a measurement region 82 on the wafer 80. Manufacturing processes have been performed on the wafer 80, and a plurality of regions, e.g., chip regions 84, may have been formed on the wafer 80. The measurement region 82 may correspond to a single chip region 84 or a plurality of chip regions 84, according to an emission range of the incident light L. In some embodiments, the measurement region 82 may correspond to at least one cell region.

The incident light L emitted to the wafer 80 may be reflected from the measurement region 82 of the wafer 80, and the scattered light S scattered away from the measurement region 82 may be incident to the detector 140. For example, the wafer 80 may include a semiconductor substrate. The semiconductor substrate may include silicon (Si), strained Si, an Si alloy, silicon carbide (SiC), silicon germanium (SiGe), silicon germanium carbide (SiGeC), germanium (Ge), a Ge alloy, gallium arsenide (GaAs), indium arsenide (InAs), a Group II-V semiconductor, a Group II-VI semiconductor, a combination thereof, or a stack thereof.

For example, the semiconductor substrate may include a variable resistance element and/or an ovonic threshold switching (OTS) material. The variable resistance element may include a phase-change material, which reversibly changes between an amorphous phase and a crystalline phase according to a heating time. The variable resistance element may include Ge, antimony (Sb), In, As, aluminum (Al), bismuth (Bi), and/or scandium (Sc). For example, the variable resistance element may include $Ge_2Sb_2Te_5$. The OTS material may include a chalcogenide switching material. In some occasions, the wafer 80 may include an organic plastic substrate instead of a semiconductor substrate. The wafer 80 may be positioned on the stage 90.

The stage 90 may support the wafer 80. For example, the stage 90 may support the wafer 80 having a diameter of about 300 mm. For example, the stage 90 may support the wafer 80 having a diameter of about 150 mm, about 200 mm, about 450 mm, or greater. The stage 90 may fix the position of the wafer 80 or move the wafer 80 to a certain position during semiconductor processes. An actuator 92 may move the stage 90. For example, the actuator 92 may move the stage 90 in a horizontal direction (the X direction and/or the Y direction) and/or a vertical direction (the Z direction). In other words, the stage 90 may move the wafer 80 in the horizontal direction (the X direction and/or the Y direction) and the vertical direction (the Z direction). For example, the actuator 92 may move the stage 90 in the vertical direction (the Z direction) in steps or stages by a distance of about 10 nm to about 10 μm.

Here, for convenience of description of the semiconductor-device inspection apparatus 1, an X-Y-Z orthogonal coordinate system is used. The vertical direction (the Z direction) may be defined as an optical axis C. Two directions that are orthogonal to the vertical direction (the Z direction) and to each other may be defined as horizontal directions (the X direction and the Y direction).

The illuminating optical system 110 may illuminate a sample with the incident light L. The wafer 80 may correspond to the sample. The illuminating optical system 110 may include the light source 111, a first lens unit 112, a beam splitter 114, and an objective lens 115.

The light source 111 may generate the incident light L. The incident light L generated by the light source 111 may include broadband light. For example, the incident light L may include white light. For example, the light source 111 may generate and emit visible light. At this time, the wavelength of the visible light may be about 400 nm to about 800 nm. However, embodiments are not limited thereto. The wavelength band of the light source 111 may vary with a measurement target and typically range from the ultraviolet (UV) band to the near infrared (NIR) band. The light source 111 may emit light of a particular wavelength or light of multiple wavelengths. However, the incident light L generated by the light source 111 is not limited to white light. For example, the incident light L may include monochromatic light having a particular wavelength or light having a particular wavelength width. Because the sensitivity of the light source 111 to the measurement region 82 of the wafer 80 varies with the wavelength thereof, the light source 111 may use various wavelength bands. However, embodiments are not limited thereto. The incident light L generated by the light source 111 may be incident to the first lens unit 112.

For example, the first lens unit 112 may include a convex lens. The first lens unit 112 may change the angular distribution of the incident light L and output the incident light L to the beam splitter 114. For example, the first lens unit 112 may convert the incident light L emitted by the light source 111 into parallel light. The first lens unit 112 may output the incident light L, which has been converted into parallel light, to the beam splitter 114.

The beam splitter 114 may reflect part of the incident light L and transmit part of the incident light L. The beam splitter 114 may reflect part of the incident light L to the objective lens 115. The incident light L reflected from the beam splitter 114 may be incident to the objective lens 115.

The objective lens 115 may illuminate the wafer 80 with the incident light L. The objective lens 115 may focus the incident light L reflected from the beam splitter 114 to a dot or other small region on the wafer 80. The objective lens 115 may transmit the incident light L and the scattered light S, which is generated when the incident light L is reflected from a measurement surface of the wafer 80. In the semiconductor-device inspection apparatus 1, the optical axis C of the incident light L incident to the wafer 80 and the optical axis C of the scattered light S reflected from the wafer 80 may be orthogonal to the measurement surface of the wafer 80.

The light condensing optical system 120 may selectively condense the scattered light S scattered away from the wafer 80. The light condensing optical system 120 may include the objective lens 115, the beam splitter 114, and a second lens unit 122. The beam splitter 114 and the objective lens 115 may be elements of both the illuminating optical system 110 and the light condensing optical system 120. The beam splitter 114 may transmit part of the scattered light S. For example, the scattered light S transmitted by the beam splitter 114 may be incident to the second lens unit 122. The objective lens 115 may transmit the scattered light S, which is generated when the incident light L is reflected from the wafer 80, to the beam splitter 114.

The second lens unit 122 may condense the scattered light S, which has passed through the beam splitter 114, on the spectrometer 130. For example, the second lens unit 122 may include a lower relay lens 122-1 and an upper relay lens 122-2.

The spectrometer 130 may receive the scattered light S emitted from the light condensing optical system 120. For example, the spectrometer 130 may include a prism and/or a diffraction grating. The spectrometer 130 may split the scattered light S, which has passed through the second lens unit 122, by wavelength. For example, the spectrometer 130 may refract the scattered light S at different angles according to wavelengths.

Light incident to the spectrometer 130 through the light condensing optical system 120 may be converted into light intensity with respect to each wavelength and collected as data by the spectrometer 130. Light intensity data collected in the manner described above may be converted into an interpretable spectral signal.

For example, the detector 140 may include a charge-coupled device (CCD) camera. However, the detector 140 is not limited to the CCD camera. The detector 140 may detect a Raman spectrum and/or light intensity data with respect to each wavelength. The detector 140 may detect a Raman spectrum from the scattered light S incident thereto.

The processing unit 200 (e.g., processor) may receive the Raman spectrum from the detector 140. The processing unit 200 may generate a bandgap spectral matrix (30 of FIG. 6) by using the Raman spectrum. For example, the processing unit 200 may receive, from the detector 140, a first Raman spectrum corresponding to a first height and a second Raman spectrum corresponding to a second height different from the first height. The processing unit 200 may generate the bandgap spectral matrix 30 (FIG. 6) by using the first and second Raman spectra.

In detail, the processing unit 200 may include a first processor 210 and a second processor 220. The first processor 210 may generate the bandgap spectral image 20 (FIG. 5) by segmenting a Raman spectrum detected by the detector 140. The second processor 220 may generate the bandgap spectral matrix 30 (FIG. 6) by using the bandgap spectral image 20 (FIG. 5) generated by the first processor 210. Operation methods of the first processor 210 and the second processor 220 are described below. The bandgap spectral matrix 30 (FIG. 6) may represent the magnitude of bandgap energy according to a vertical level, a height, and/or a depth. The first processor 210 may be connected to the second processor 220.

For example, the first processor 210 may correspond to a data analyzer, and the second processor 220 may correspond to a mapping system. The first processor 210 may obtain physical parameters of an inspection region of the wafer 80 from Raman spectrum data. At least one of the first processor 210 and the second processor 220 may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). As another example, the first processor 210 and/or the second processor 220 may correspond to a data readout computer.

Semiconductor-device inspection apparatuses usually do not include an actuator moving a wafer stage in a vertical direction, and accordingly, it is relatively difficult to obtain Raman spectrum data at different heights.

Contrarily, according to an embodiment, the semiconductor-device inspection apparatus 1 may include the actuator 92 that moves the stage 90 in the vertical direction (the Z direction). Accordingly, the semiconductor-device inspection apparatus 1 may obtain a plurality of pieces of Raman spectrum data at different heights. In addition, the semiconductor-device inspection apparatus 1 may generate the bandgap spectral matrix 30 (FIG. 6) by using the Raman spectrum data. Accordingly, the semiconductor-device inspection apparatus 1 may accurately measure the magnitude of bandgap energy of a semiconductor device with respect to a vertical level.

Figure 3:
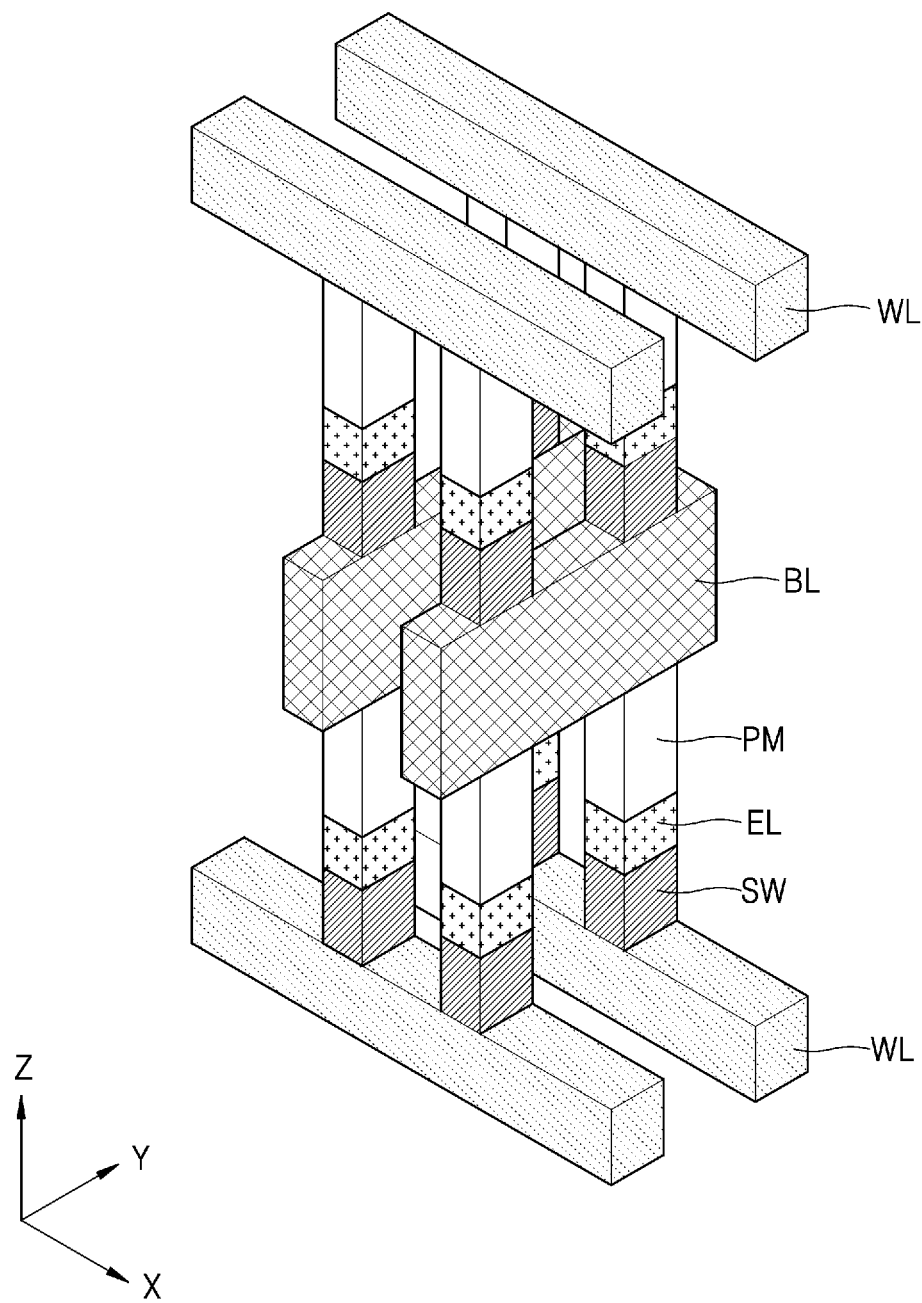
FIG. 3 is a perspective view of a target to be inspected by a semiconductor-device inspection apparatus, according to an embodiment.

FIG. 3 is a perspective view of a target to be inspected by a semiconductor-device inspection apparatus, according to an embodiment.

Referring to FIGS. 1 to 3, the semiconductor-device inspection apparatus 1 may inspect a memory device 300. For example, the semiconductor-device inspection apparatus 1 may measure bandgap energy data, pattern height data, physical property data, chemical bonding data, vibration data, and/or stress data of each of a variable resistance element PM and/or a switching element SW of the memory device 300.

The memory device 300 may include a word line WL, a bit line BL, an electrode element EL, the variable resistance element PM, and the switching element SW. When the variable resistance element PM includes a phase-change material, of which the resistance varies with temperature, the memory device 300 may include phase-change random access memory (PRAM).

The electrode element EL, the variable resistance element PM, and the switching element SW may be between the word line WL and the bit line BL. The electrode element EL may be between the variable resistance element PM and the switching element SW.

The electrode element EL may include a conductive material, e.g., W, Ti, Ta, Al, Cu, C, CN, TiN, TiAlN, TiSiN, TiCN, TiCSiN, WN, CoSiN, WSiN, TaN, TaCN, TaSiN, TiO, or a combination thereof.

The variable resistance element PM may include a phase-change material, which reversibly changes between an amorphous phase and a crystalline phase according to a heating time. For example, the phase of the variable resistance element PM may be reversibly changed by Joule heat that is generated by a voltage applied to opposite ends of the variable resistance element PM, and the variable resistance element PM may include a material, of which the resistance may be changed by this phase change. In one or more embodiments, the variable resistance element PM may include a chalcogenide material as a phase-change material.

In embodiments, the variable resistance element PM may include two- to five-component materials including Ge, Sb, In, As, Al, Bi, and/or Sc.

In one or more embodiments, the variable resistance element PM may include a material selected from the two- to five-component materials described above and at least one element selected from the group consisting of B, C, N, O, P, Cd, W, Ti, Hf, and Zr.

The switching element SW may include an amorphous chalcogenide switching material. The switching element SW may include a material layer, of which the resistance may be changed according to the magnitude of a voltage applied to opposite ends of the switching element SW. For example, the switching element SW may include an OTS material. The OTS material may include a chalcogenide switching material.

In embodiments, the switching element SW may include two- to six-component materials including Ge, As, and/or Si.

In one or more embodiments, the switching element SW may include at least one material selected from the two- to six-component materials described above and at least one element selected from the group consisting of B, C, N, and O.

FIGS. 4A to 4E are graphs illustrating a method of generating a bandgap spectral image from a plurality of Raman spectra by using a semiconductor-device inspection apparatus, according to an embodiment.

Figure 4A:
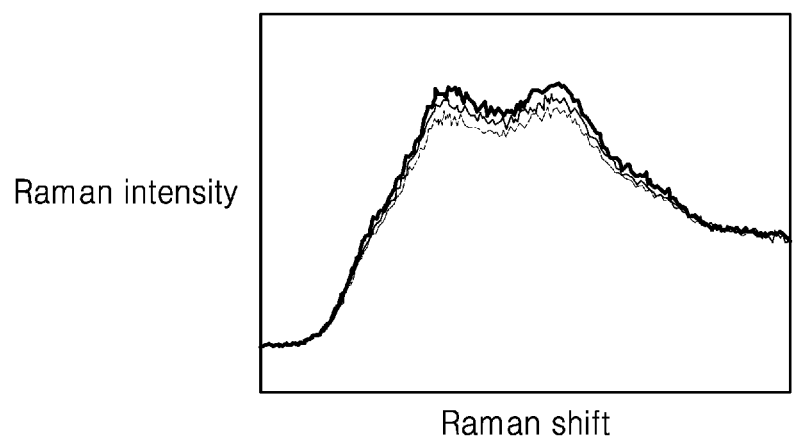
FIGS. 4A to 4E are graphs illustrating a method of generating a bandgap spectral image from a plurality of Raman spectra by using a semiconductor-device inspection apparatus, according to an embodiment.
Figure 4B:
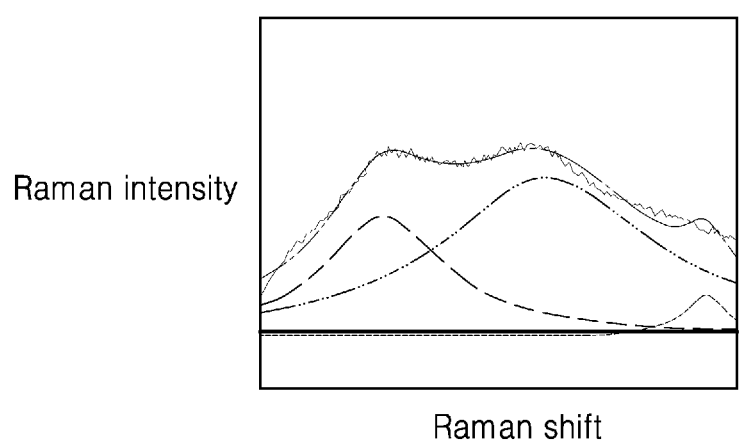

In the graphs of FIGS. 4A and 4B, the vertical axis may be Raman intensity, and the horizontal axis may be Raman shift. The horizontal and vertical axes are expressed in arbitrary units (a.u.).

Referring to FIGS. 1, 2, and 4A, the first processor 210 of the semiconductor-device inspection apparatus 1 may receive a plurality of Raman spectra detected by the detector 140. Because materials having different parameters from each other are in the measurement region 82 of the wafer 80, the detector 140 may detect a plurality of Raman spectra.

Referring to FIG. 4B, the first processor 210 may segment the Raman spectra in FIG. 4A. For example, the first processor 210 may perform segmentation by deconvoluting the Raman spectra in FIG. 4A. The first processor 210 may obtain Raman spectra of different materials by segmenting a plurality of Raman spectra.

Although it is illustrated in FIG. 4B that three different materials are included in the measurement region 82 (see, e.g., FIG. 1), embodiments are not limited thereto. For example, even when two or at least four different materials are included in the measurement region 82, the first processor 210 may segment the materials.

Figure 4C:
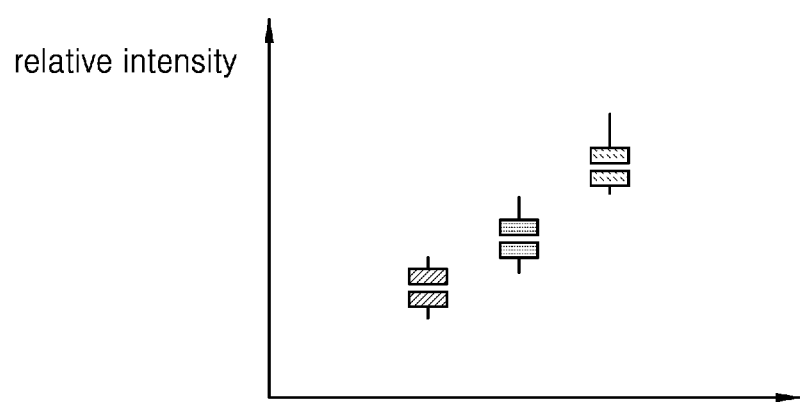

In the graph of FIG. 4C, the vertical axis may be relative intensity of segmented Raman spectra. The vertical axis is expressed in a.u.

Referring to FIGS. 2 and 4C, the first processor 210 may classify segmented Raman spectra. For example, the first processor 210 may classify segmented Raman spectra by using, as a variable, a peak area, a peak intensity, a full width at half maximum (FWHM), and/or a Raman shift position where a peak is located.

Figure 4D:
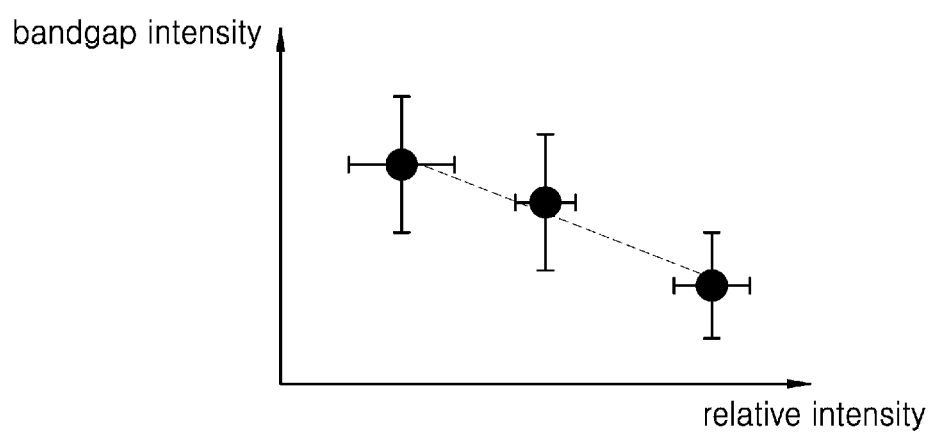

In the graph of FIG. 4D, the horizontal axis may be relative intensity of classified Raman spectra, and the vertical axis may be bandgap intensity. The horizontal and vertical axes are expressed in a.u.

Referring to FIG. 4D, the first processor 210 may match classified Raman spectrum data to the intensity of a measurement variable. For example, the measurement variable may include bandgap energy, a pattern height, a physical property, chemical bonding, vibration, and/or stress.

According to an embodiment, after classified Raman spectrum data is matched to the size of an auxiliary parameter, the size of the auxiliary parameter may be matched to the intensity of a measurement variable. For example, the auxiliary parameter may include bandgap energy, a pattern height, a physical property, chemical bonding, vibration, and/or stress. The auxiliary parameter may be a variable different from the measurement variable.

When the relationship between a measurement variable to be measured and classified Raman spectrum data is not known, the intensity of an auxiliary parameter may be measured, and then, the intensity of the measurement variable may be measured.

In an embodiment, when the relationship between a measurement variable to be measured and classified Raman spectrum data is known, the first processor 210 may directly match classified Raman spectrum data to the intensity of the measurement variable.

In FIG. 4D, classified Raman spectrum data is matched to bandgap intensity. In other words, at this time, the measurement variable is bandgap energy.

Figure 4E:
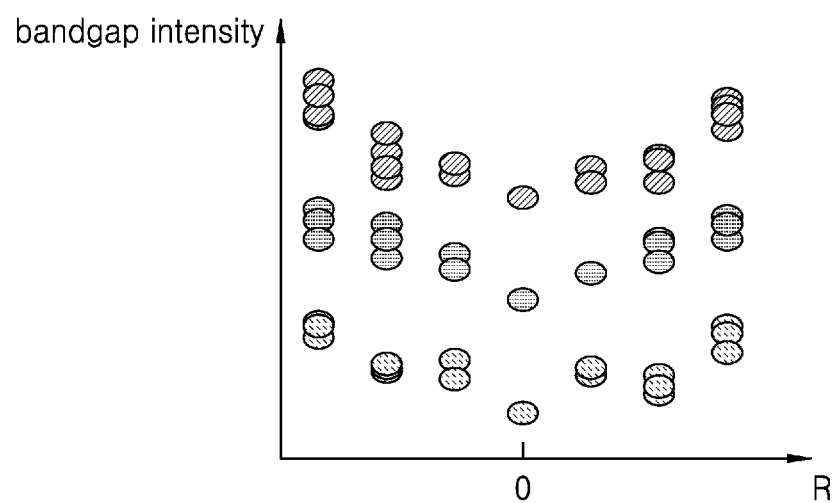

FIG. 4E is a graph showing bandgap intensity with respect to a wafer. In the graph, the horizontal axis is a radius R of the wafer 80, and the vertical axis is bandgap intensity. The horizontal and vertical axes are expressed in a.u.

Referring to FIGS. 1, 2, and 4E, the first processor 210 may indicate bandgap intensity according to the position of the wafer 80. The graph of FIG. 4E may be referred to as the bandgap spectral image 20. As described above, a pattern height spectrum, a physical property spectrum, chemical bonding spectrum, vibration spectrum, and/or stress spectrum according to the position of the wafer 80 may be generated.

Figure 5:
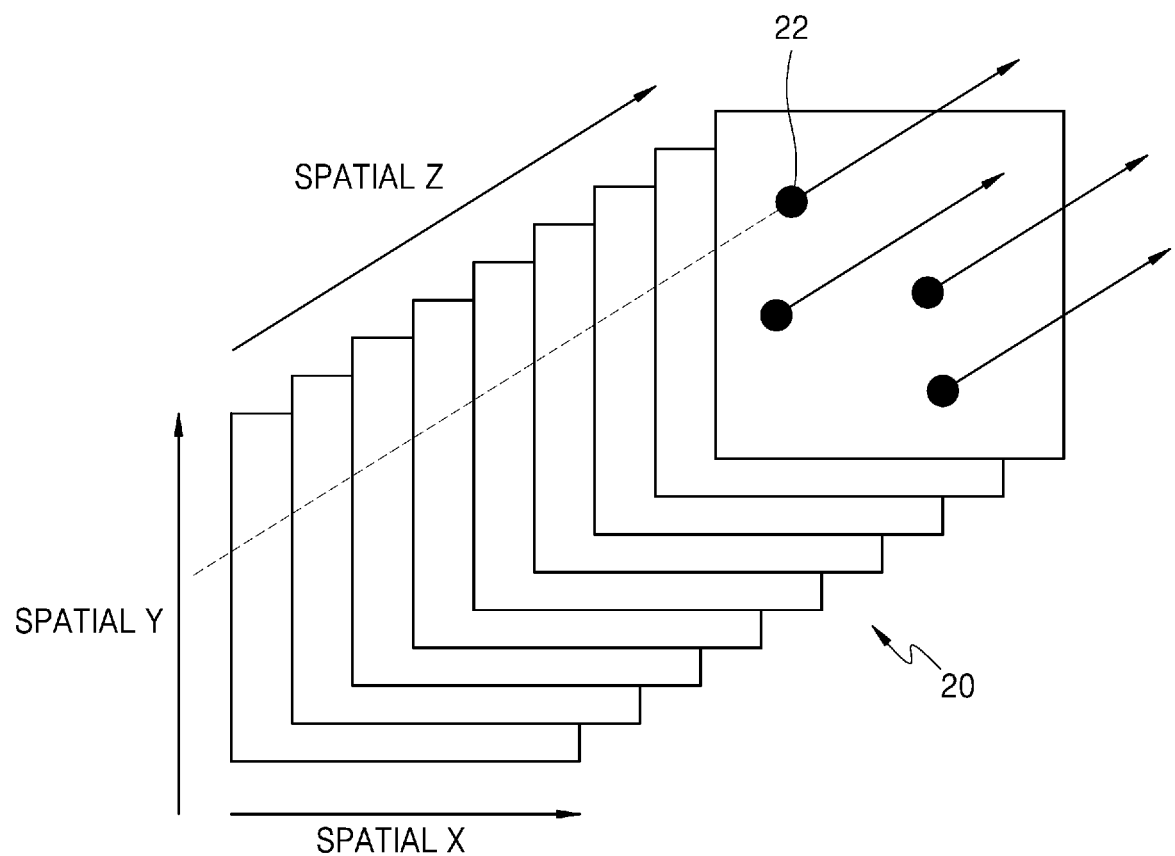
FIG. 5 is a conceptual diagram illustrating a bandgap spectral image with respect to a height, according to an embodiment.
Figure 6:
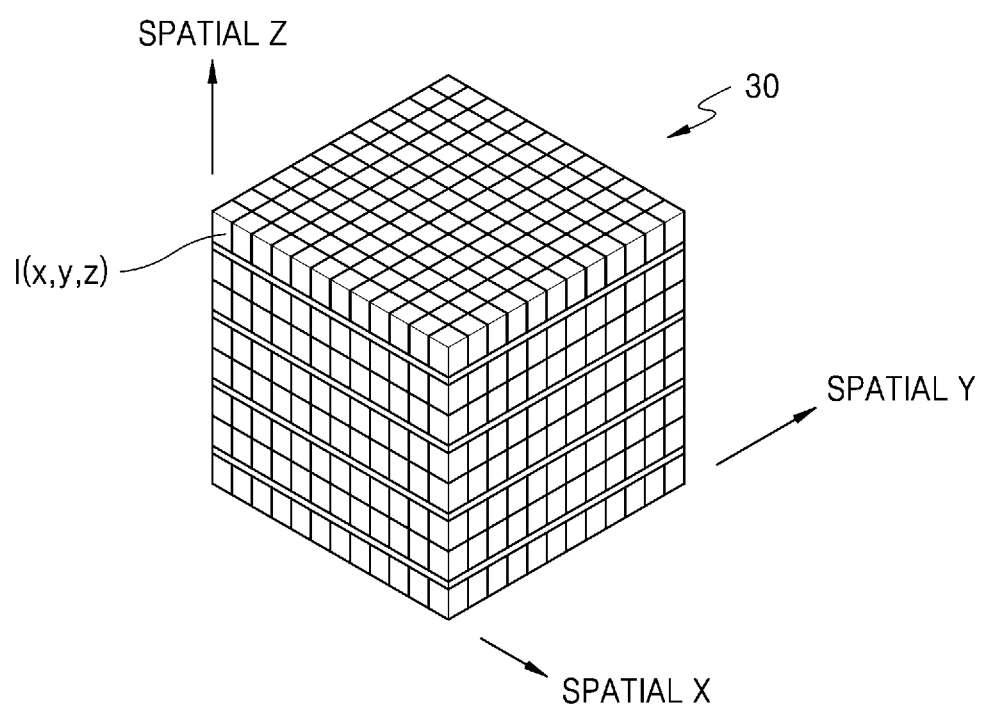
FIG. 6 is a conceptual diagram illustrating a bandgap spectral matrix according to an embodiment.

FIG. 5 is a conceptual diagram illustrating a bandgap spectral image with respect to a height, according to an embodiment. FIG. 6 is a conceptual diagram illustrating a bandgap spectral matrix according to an embodiment.

Referring to FIGS. 2, 5, and 6, the bandgap spectral image 20 may be generated at each of the different heights of a measurement target 22. Here, the measurement target 22 may be the wafer 80 in FIG. 1 or the memory device 300 of FIG. 3. For example, the measurement target 22 may include a volatile memory chip, such as a dynamic random access memory (DRAM) chip or a static RAM (SRAM) chip, or a non-volatile memory chip, such as a flash memory chip, a magnetoresistive RAM (MRAM) chip, a ferroelectric RAM (FeRAM) chip, or a resistive RAM (RRAM) chip. For example, the measurement target 22 may be a logic semiconductor chip. For example, a semiconductor device including a semiconductor dielectric layer may be the measurement target 22. The bandgap spectral image 20 may be configured with data of a spatial coordinate X (spatial X) and a spatial coordinate Y (spatial Y). For example, "n" different bandgap spectral images 20 may be measured with respect to "n" different heights.

The bandgap spectral matrix 30 may be generated by the second processor 220 using a plurality of bandgap spectral images 20. However, embodiments are not limited thereto. The detector 140 may measure the scattered light S and directly obtain the bandgap spectral matrix 30, and the bandgap spectral matrix 30 output from the detector 140 may be stored in the first processor 210 of the processing unit 200.

The bandgap spectral matrix 30 may correspond to a virtual bandgap spectral data structure obtained through segmentation, classification, and measurement variable matching of Raman spectra in a spatial area. A bandgap spectral image 20 may be referred to as a spectral domain. The bandgap spectral matrix 30 may be referred to as a bandgap spectral cube. The bandgap spectral matrix 30 may be configured with spatial X, spatial Y, and a plurality of bandgap spectral images 20 with respect to a spatial Z in width, as shown in FIG. 6. In other words, the bandgap spectral matrix 30 may be configured with spectral cube with spatial X, spatial Y, and spatial Z as coordinates axes for the intensity of the bandgap of the measurement target 22 (FIG. 5). A coordinate in the bandgap spectral matrix 30 may be referred to as I(x, y, z).

Figure 7:
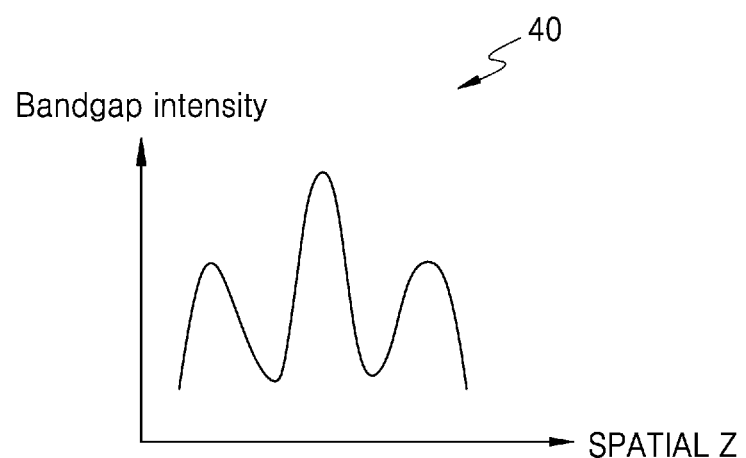
FIG. 7 is a conceptual diagram illustrating a bandgap spectrum with respect to a height, according to an embodiment.

FIG. 7 is a conceptual diagram illustrating a bandgap spectrum with respect to a height, according to an embodiment. In FIG. 7, the horizontal axis is spatial Z, and the vertical axis is bandgap intensity. The horizontal and vertical axes are expressed in a.u.

Referring to FIGS. 2, 6, and 7, the second processor 220 may generate a bandgap spectrum 40 with respect to a vertical level by using the bandgap spectral matrix 30. In other words, the second processor 220 may indicate bandgap intensity according to spatial Z. Accordingly, the semiconductor-device inspection apparatus 1 may measure the intensity of a measurement variable with respect to the height of the measurement region 82.

Figure 8:
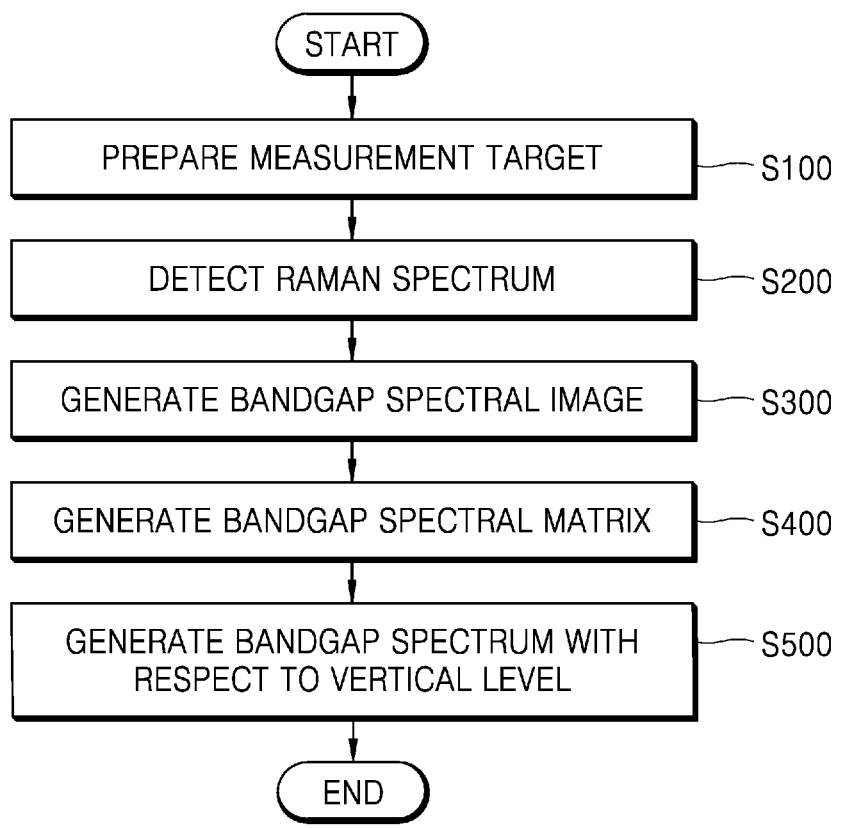
FIG. 8 is a flowchart of a method of inspecting a semiconductor device by using a semiconductor-device inspection apparatus, according to an embodiment.

FIG. 8 is a flowchart of a method of inspecting a semiconductor device by using a semiconductor-device inspection apparatus, according to an embodiment.

Referring to FIG. 2 and FIGS. 5 to 8, a measurement target 22 may be prepared in operation S100. For example, the measurement target 22 may be the wafer 80 in FIG. 1 or the memory device 300 of FIG. 3.

Subsequently, a Raman spectrum of the measurement target 22 may be detected in operation S200. After emitting the incident light L to a measurement sample, the semiconductor-device inspection apparatus 1 may detect the scattered light S, which has been scattered away from the measurement sample, and detect a plurality of Raman spectra.

Subsequently, a bandgap spectral image 20 may be generated using the Raman spectra in operation S300. The first processor 210 may generate the bandgap spectral image 20 with respect to each of different materials.

Subsequently, the second processor 220 may generate the bandgap spectral matrix 30 by using the bandgap spectral image 20 in operation S400. The second processor 220 may generate the bandgap spectral matrix 30 by combining bandgap spectral images 20 respectively generated at different spatial Z.

Subsequently, the second processor 220 may generate the bandgap spectrum 40 with respect to the vertical level of the measurement target 22 by using the bandgap spectral matrix 30 in operation S500. In other words, the semiconductor-device inspection apparatus 1 may generate the bandgap spectrum 40 with respect to the height, i.e., the vertical level, of the measurement target 22.

Figure 9:
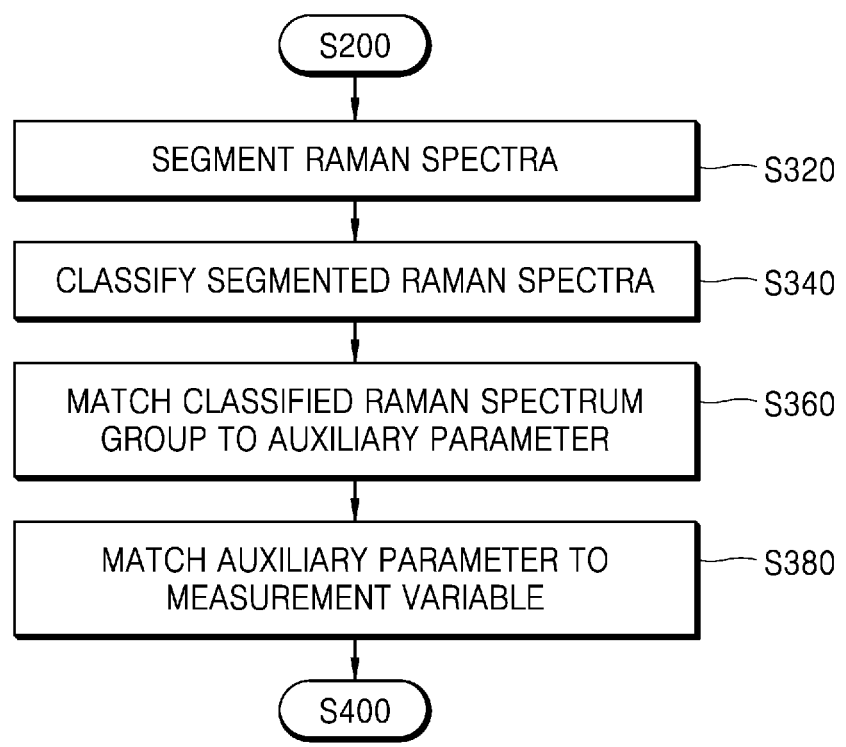
FIG. 9 is a flowchart of a method of generating a bandgap spectral image, according to an embodiment.

FIG. 9 is a flowchart of a method of generating a bandgap spectral image, according to an embodiment.

Referring to FIGS. 2, 7, and 9, the first processor 210 may segment the Raman spectra in operation S320. The first processor 210 may perform segmentation by deconvoluting the Raman spectra.

Subsequently, the first processor 210 may classify the segmented Raman spectra in operation S340. The segmented Raman spectra may be classified by a variable or variables, such as the area of a peak of each of the segmented Raman spectra, the intensity of the peak, the FWHM thereof, and/or a Raman shift position where the peak is located.

Subsequently, the first processor 210 may match each classified Raman spectrum group to an intensity of an auxiliary parameter in operation S360. The direct correlation between the classified Raman spectrum group and a measurement variable may not be known. When the correlation between the classified Raman spectrum group and the auxiliary parameter is known and the correlation between the auxiliary parameter and the measurement variable is known, the correlation between the classified Raman spectrum group and the measurement variable may be indirectly determined.

The auxiliary parameter may be different from the measurement variable. For example, the auxiliary parameter may include bandgap energy, a pattern height, a physical property, chemical bonding, vibration, and/or stress.

Subsequently, the first processor 210 may match the intensity of the auxiliary parameter to an intensity of the measurement variable in operation S380. For example, the measurement variable may be bandgap energy. Accordingly, the first processor 210 may calculate the intensity of the measurement variable by using a plurality of Raman spectra.

Figure 10:
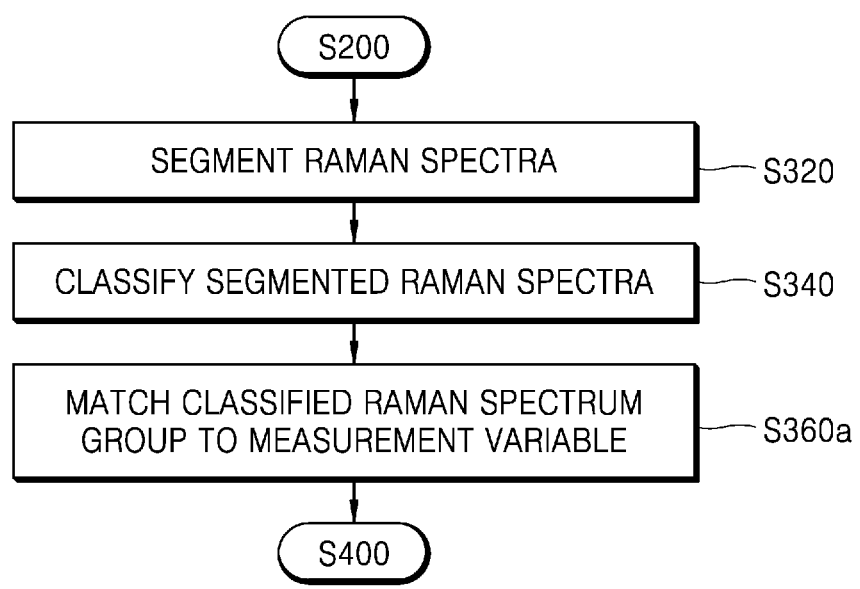
FIG. 10 is a flowchart of a method of generating a bandgap spectral image, according to an embodiment.

FIG. 10 is a flowchart of a method of generating a bandgap spectral image, according to an embodiment. Operation S320, in which a plurality of Raman spectra are segmented, and operation S340, in which the segmented Raman spectra are classified, in FIG. 10 are substantially the same as operations S320 and S340 in FIG. 9, and therefore, only operation S360a is described below.

Referring to FIGS. 2, 9, and 10, when the direct correlation between the classified Raman spectrum group and the measurement variable is known, the first processor 210 may match the classified Raman spectrum group to the measurement variable in operation S360a. For example, the measurement variable may be bandgap energy. Accordingly, the first processor 210 may calculate the intensity of the measurement variable by using a plurality of Raman spectra.

While the disclosure has been particularly shown and described with reference to embodiments thereof, it will be understood that various changes in form and details may be made therein without departing from the spirit and scope of the following claims.

What is claimed is:

1. A semiconductor-device inspection apparatus comprising:
   a stage configured to allow a measurement target to be placed thereon;
   an actuator configured to move the stage in a vertical direction;

a detector configured to detect a plurality of Raman spectra from scattered light scattered away from the measurement target; and a processor configured to generate a plurality of spectral images for a measurement variable by using the plurality of Raman spectra detected by the detector, wherein the detector is further configured to detect the plurality of Raman spectra at different vertical levels of the measurement target, wherein the processor is further configured to match the plurality of Raman spectra to an auxiliary parameter and match the auxiliary parameter to the measurement variable based on a relationship between the plurality of Raman spectra and the measurement variable being undetermined, and wherein the processor is further configured to directly match the plurality of Raman spectra to the measurement variable based on the relationship between the plurality of Raman spectra and the measurement variable being determined.

2. The semiconductor-device inspection apparatus of claim 1, wherein the processor comprises:

a first processor configured to segment the plurality of Raman spectra detected by the detector, classify a plurality of segmented Raman spectra, and generate the plurality of spectral images for the measurement variable from the plurality of classified Raman spectra; and a second processor configured to generate a spectral matrix for the measurement variable by using the plurality of spectral images for the measurement variable.

3. The semiconductor-device inspection apparatus of claim 1, wherein the measurement variable comprises at least one selected from the group consisting of bandgap energy, a pattern height, a physical property, chemical bonding, vibration, and stress.

4. The semiconductor-device inspection apparatus of claim 1, further comprising a spectrometer configured to split the scattered light by wavelengths.

5. The semiconductor-device inspection apparatus of claim 1, further comprising:

a light source configured to generate and output incident light;

an objective lens configured to transmit the incident light and the scattered light resulting from scattering of the incident light away from a surface of the measurement target; and a light condensing optical system, comprising a beam splitter and at least one lens, configured to focus, on the detector, the scattered light transmitted by the objective lens.

6. The semiconductor-device inspection apparatus of claim 1, wherein the actuator moves the stage in the vertical direction by a distance of about 10 nm to about 10 µm.

7. The semiconductor-device inspection apparatus of claim 1, wherein the measurement target comprises at least one selected from the group consisting of phase-change random access memory (PRAM), dynamic RAM (DRAM), a flash memory chip, a non-volatile memory chip, and a logic semiconductor chip.

8. A semiconductor-device inspection apparatus comprising:

a stage configured to allow a measurement target to be placed thereon;

an actuator configured to move the stage in a vertical direction;

a light source configured to generate and output incident light;

an objective lens configured to transmit the incident light and scattered light resulting from scattering of the incident light away from the measurement target;

a spectrometer configured to split the scattered light by wavelengths;

a detector configured to detect a plurality of Raman spectra from the scattered light;

a light condensing optical system, comprising a beam splitter and at least one lens, configured to focus, on the detector, the scattered light transmitted by the objective lens;

a first processor configured to: segment the plurality of Raman spectra detected by the detector, classify a plurality of segmented Raman spectra, and generate a plurality of spectral images for a measurement variable from the plurality of classified Raman spectra; and a second processor configured to generate a spectral matrix for the measurement variable by using the plurality of spectral images for the measurement variable, wherein the detector is further configured to detect the plurality of Raman spectra at different vertical levels of the measurement target, wherein the first processor is further configured to match the plurality of classified Raman spectra to an auxiliary parameter and match the auxiliary parameter to the measurement variable based on a relationship between the plurality of classified Raman spectra and the measurement variable being undetermined, and wherein the first processor is further configured to directly match the plurality of classified Raman spectra to the measurement variable based on the relationship between the plurality of classified Raman spectra and the measurement variable being determined.

9. The semiconductor-device inspection apparatus of claim 8, wherein each of the measurement variable and the auxiliary parameter comprises at least one selected from the group consisting of bandgap energy, a pattern height, a physical property, chemical bonding, vibration, and stress, and the measurement variable is different from the auxiliary parameter.

10. The semiconductor-device inspection apparatus of claim 8, wherein the stage is further configured to support at least one selected from the group consisting of a wafer having a diameter of 150 mm, a wafer having a diameter of 200 mm, a wafer having a diameter of 300 mm, and a wafer having a diameter of 450 mm.

11. A method of inspecting a semiconductor device, the method comprising:

providing a measurement target;

detecting a plurality of Raman spectra from scattered light scattered away from the measurement target;

generating a plurality of spectral images for a measurement variable by using the plurality of Raman spectra; and generating a spectral matrix for the measurement variable by using the plurality of spectral images for the measurement variable, wherein the detecting of the plurality of Raman spectra is performed using the scattered light scattered away from the measurement target at different vertical levels, wherein the method further comprises:

matching the plurality of Raman spectra to an auxiliary parameter and matching the auxiliary parameter to the measurement variable based on a relationship between the plurality of classified Raman spectra and the measurement variable being undetermined; and directly matching the plurality of Raman spectra to the measurement variable based on the relationship between the plurality of Raman spectra and the measurement variable being determined.

12. The method of claim 11, wherein the generating of the plurality of spectral images for the measurement variable comprises:

segmenting the plurality of Raman spectra; and
classifying the plurality of segmented Raman spectra.

13. The method of claim 12, wherein the segmenting of the plurality of Raman spectra comprises deconvoluting the plurality of Raman spectra.

14. The method of claim 12, wherein the classifying of the plurality of segmented Raman spectra is performed using at least one selected from the group consisting of a peak area of each of the plurality of segmented Raman spectra, a peak intensity of the plurality of segmented Raman spectra, a full width at half maximum (FWHM) of the plurality of segmented Raman spectra, and a Raman shift position where a peak of the plurality of segmented Raman spectra is located.

15. The method of claim 12, wherein the generating of the plurality of spectral images for the measurement variable comprises:

matching a plurality of classified Raman spectra to an intensity of the auxiliary parameter; and
matching the intensity of the auxiliary parameter to an intensity of the measurement variable.

16. The method of claim 15, wherein the measurement variable comprises bandgap energy, and wherein the auxiliary parameter comprises at least one selected from the group consisting of a pattern height, a physical property, chemical bonding, vibration, and stress.

17. The method of claim 11, further comprising generating a spectrum for the measurement variable with respect to a vertical level by using the spectral matrix for the measurement variable.

* * * * *